(12) United States Patent
Robles

(10) Patent No.: US 9,821,637 B1
(45) Date of Patent: Nov. 21, 2017

(54) WINDSHIELD SUNSHADE WITH SOLAR POWERED FANS

(71) Applicant: Anthony Robles, Whittier, CA (US)

(72) Inventor: Anthony Robles, Whittier, CA (US)

(*) Notice: Subject to any disclaimer, the term of this patent is extended or adjusted under 35 U.S.C. 154(b) by 0 days.

(21) Appl. No.: 15/134,056

(22) Filed: Apr. 20, 2016

(51) Int. Cl.
| | |
|---|---|
| *B60J 3/00* | (2006.01) |
| *B60J 1/20* | (2006.01) |
| *B60H 1/00* | (2006.01) |
| *B60H 1/24* | (2006.01) |
| *H02S 10/40* | (2014.01) |
| *H02S 40/38* | (2014.01) |

(52) U.S. Cl.
CPC ........ *B60J 1/2091* (2013.01); *B60H 1/00264* (2013.01); *B60H 1/00521* (2013.01); *B60H 1/242* (2013.01); *H02S 10/40* (2014.12); *H02S 40/38* (2014.12)

(58) Field of Classification Search
CPC ..... B60J 1/2091; B60H 1/00264; B60H 1/242
USPC .............................................. 160/127, 370.23
See application file for complete search history.

(56) References Cited

U.S. PATENT DOCUMENTS

| | | | | |
|---|---|---|---|---|
| 4,412,478 A | * | 11/1983 | Osher .................... | F24F 13/20 248/222.51 |
| 4,736,980 A | | 4/1988 | Eubanks | |
| 4,784,215 A | * | 11/1988 | Sing ....................... | A01G 9/225 126/625 |
| 4,805,955 A | * | 2/1989 | Levy ...................... | B60J 1/2091 160/84.04 |
| 5,076,634 A | | 12/1991 | Muller et al. | |
| 5,094,151 A | * | 3/1992 | Bernard ................. | B60H 1/267 160/368.1 |
| 5,296,678 A | | 3/1994 | Schnorf | |
| 5,344,361 A | * | 9/1994 | Matthias ............ | B60H 1/00428 136/291 |
| 5,397,268 A | | 3/1995 | Chang et al. | |
| D370,650 S | | 6/1996 | Eskandry | |
| 5,692,554 A | * | 12/1997 | Huang ................... | B60J 1/2091 160/370.23 |
| 5,826,435 A | * | 10/1998 | Hange ................ | B60H 1/00264 62/190 |
| D416,996 S | | 11/1999 | Mack | |
| 6,027,137 A | * | 2/2000 | Rura ....................... | A47C 7/66 261/DIG. 3 |

(Continued)

FOREIGN PATENT DOCUMENTS

GB  2317006 A  * 3/1998 ............. B60H 1/267

*Primary Examiner* — Katherine Mitchell
*Assistant Examiner* — Johnnie A Shablack
(74) *Attorney, Agent, or Firm* — Stevenson IP, LLC

(57) ABSTRACT

A windshield sunshade with solar powered fans including a foldable, pleated opaque panel including a plurality of panel section with at least two panel sections having a solar powered fan motor-blade unit centrally disposed in a recessed portion thereof. A shaft of each fan-motor blade unit is detachable from at least one of a yoke and a motor thereof to permit a casing along with vanes attached thereto to be detached from the respective panel section to fold the panel. Each fan motor-blade unit includes at least one solar module fixedly disposed on the outer side of the respective panel section power the motor. An on-off switch proximal each fan motor-blade unit in a position proximal the vehicle dashboard is provided. A protective front grill is disposed solely over the entire one of each recessed portion to protect against contact with the vanes of the fan motor-blade unit.

2 Claims, 5 Drawing Sheets

(56) References Cited

U.S. PATENT DOCUMENTS

| | | | |
|---|---|---|---|
| 6,126,415 A | 10/2000 | Lasko | |
| 6,192,628 B1 * | 2/2001 | Pinheiro | B60J 1/20 160/105 |
| 6,202,394 B1 * | 3/2001 | Russ | A01D 34/001 180/84 |
| 6,202,732 B1 * | 3/2001 | Chen | B60J 1/2091 160/370.23 |
| 6,224,479 B1 * | 5/2001 | Iino | B60J 1/20 454/132 |
| 6,289,968 B1 * | 9/2001 | Karten | B60J 1/2091 160/370.21 |
| 6,409,206 B1 * | 6/2002 | Willrich | B62B 9/00 261/DIG. 3 |
| 6,662,572 B1 * | 12/2003 | Howard | B60H 1/00264 62/235.1 |
| 6,672,954 B2 * | 1/2004 | Shtanko | B60H 1/00264 454/131 |
| 6,935,944 B2 * | 8/2005 | Bigelow, Jr. | B60H 1/00407 454/143 |
| 7,150,162 B1 * | 12/2006 | Brunner | B62B 9/00 280/658 |
| 7,618,079 B2 * | 11/2009 | Rawat | B60J 3/0208 296/97.1 |
| 7,658,670 B1 * | 2/2010 | Brown | B60H 1/267 454/124 |
| 8,720,971 B2 * | 5/2014 | Russ | B60H 1/00407 296/102 |
| 2004/0162017 A1 * | 8/2004 | Pe'er | B60H 1/00264 454/131 |
| 2007/0293136 A1 * | 12/2007 | Hancock | B60H 1/00264 454/143 |
| 2008/0169013 A1 * | 7/2008 | Brockel | E04H 15/14 135/93 |
| 2009/0308565 A1 * | 12/2009 | Jones | B60H 1/00407 165/41 |
| 2011/0088853 A1 * | 4/2011 | Boston | B60J 1/20 160/87 |
| 2014/0044576 A1 * | 2/2014 | Geisland | B60J 1/244 417/423.5 |
| 2015/0217628 A1 * | 8/2015 | Talarico | B60H 1/267 454/75 |
| 2016/0129766 A1 * | 5/2016 | Lenterman | B60J 1/2091 160/370.23 |

* cited by examiner

WINDSHIELD SUNSHADE WITH SOLAR POWERED FANS

BACKGROUND OF THE INVENTION

Various types of fans, including fans disposed within vehicle sun visors, are known in the prior art. However, what is needed is a windshield sunshade with solar powered fans recessed within at least two panel sections of a foldable opaque panel mountable between a dashboard and windshield of a vehicle and which are detachable from the respective panel section to accommodate panel folding.

FIELD OF THE INVENTION

The present invention relates to fans for generating air flow, and more particularly, to a windshield sunshade with solar powered fans.

SUMMARY OF THE INVENTION

The general purpose of the present windshield sunshade with solar powered fans, described subsequently in greater detail, is to provide a windshield sunshade with solar powered fans which has many novel features that result in a windshield sunshade with solar powered fans which is not anticipated, rendered obvious, suggested, or even implied by prior art, either alone or in combination thereof.

To accomplish this, the present windshield sunshade with solar powered fans is devised to cool an interior of a vehicle which includes side wall sections extending along lateral edges of the windshield and a rear view mirror attached to a mounting post connecting the rear view mirror to the windshield. The present device includes a foldable opaque panel including a flexible membrane having a plurality of spaced apart pleats along a longitudinal axis and a plurality of panel sections. The pleats extend transversely to the longitudinal axis and permit the panel to be folded for storage. One of the plurality of panel sections is disposed between each of the spaced apart pleats. The panel includes a pair of opposed, lateral marginal edge portions and a notched upper central portion centrally disposed between the marginal edge portions when the panel is in an extended orientation. Each panel section also has an outer side.

A solar powered fan motor-blade unit is centrally disposed in a recessed portion of each of at least two of the panel sections in a position proximal a respective one of a driver's side of the vehicle and a front passenger side of the vehicle. Each fan-motor blade unit has a plurality of vanes attached to a casing, a yoke within the casing, a motor disposed within the respective panel section, and a shaft in operational communication with the yoke and the motor. The shaft is detachable from at least one of the yoke and the motor to permit the casing along with the vanes to be detached from the panel section in order to fold the panel for storage. Each fan motor-blade unit includes at least one solar module fixedly disposed on the outer side of the respective panel section to provide a source of power to the motor. An on-off switch is disposed proximal each fan motor-blade unit in a position proximal a dashboard of the vehicle to operate the fan motor-blade unit. A protective front grill is disposed solely over the entire one of each recessed portion to protect against contact with the vanes of the fan motor-blade unit.

Thus has been broadly outlined the more important features of the present windshield sunshade with solar powered fans so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
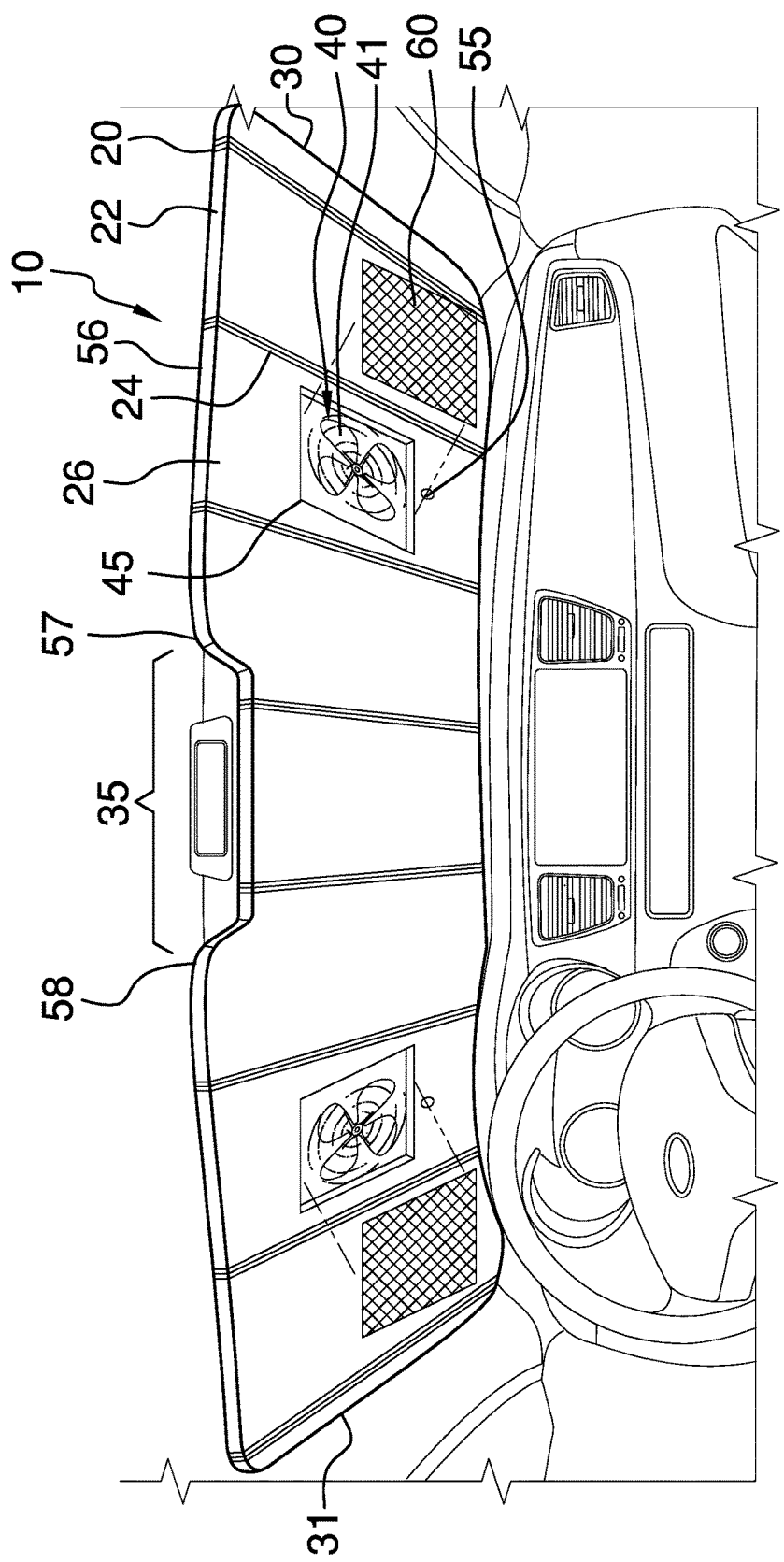
FIG. 1 is an in-use isometric view.
Figure 2:
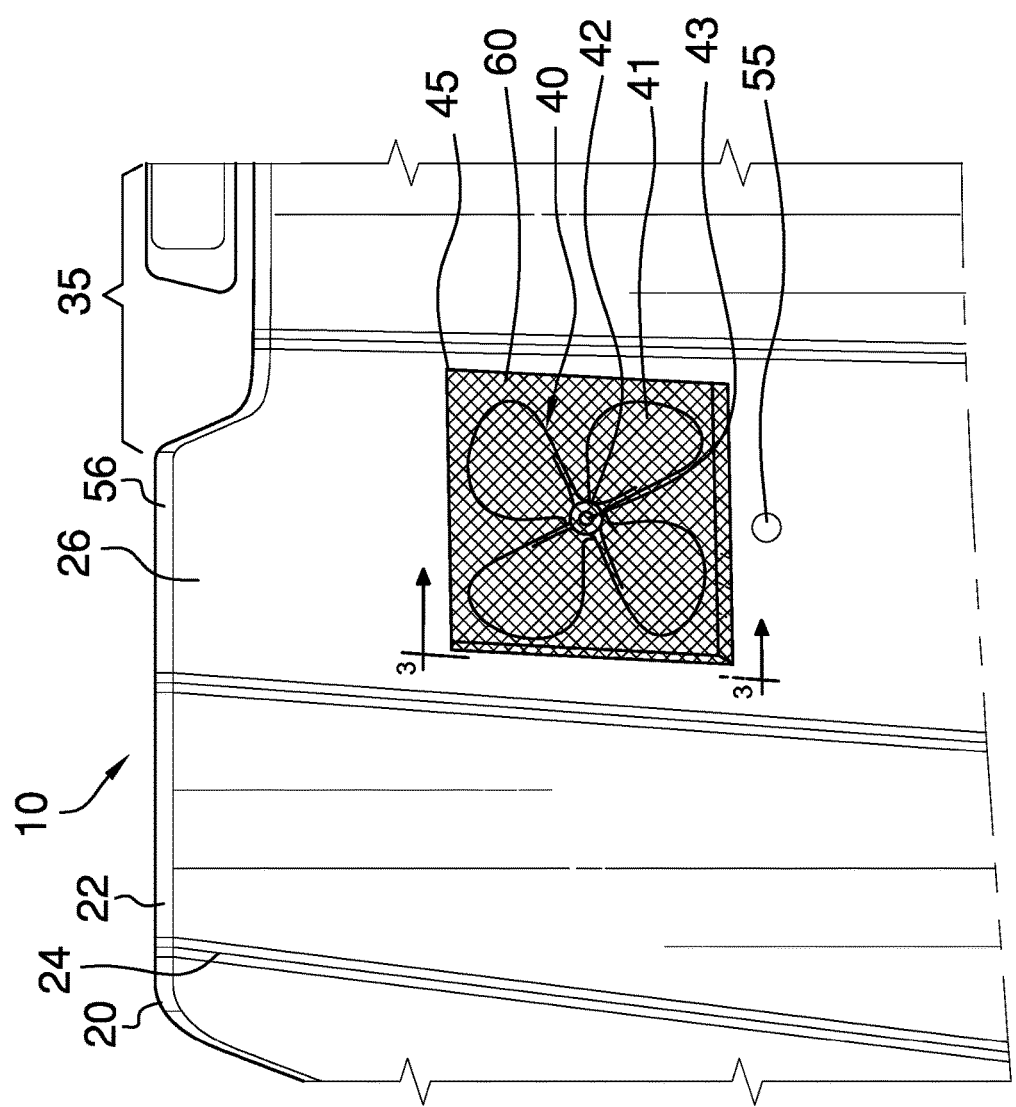
FIG. 2 is a front elevation view of a single solar powered fan motor-blade unit.
Figure 3:
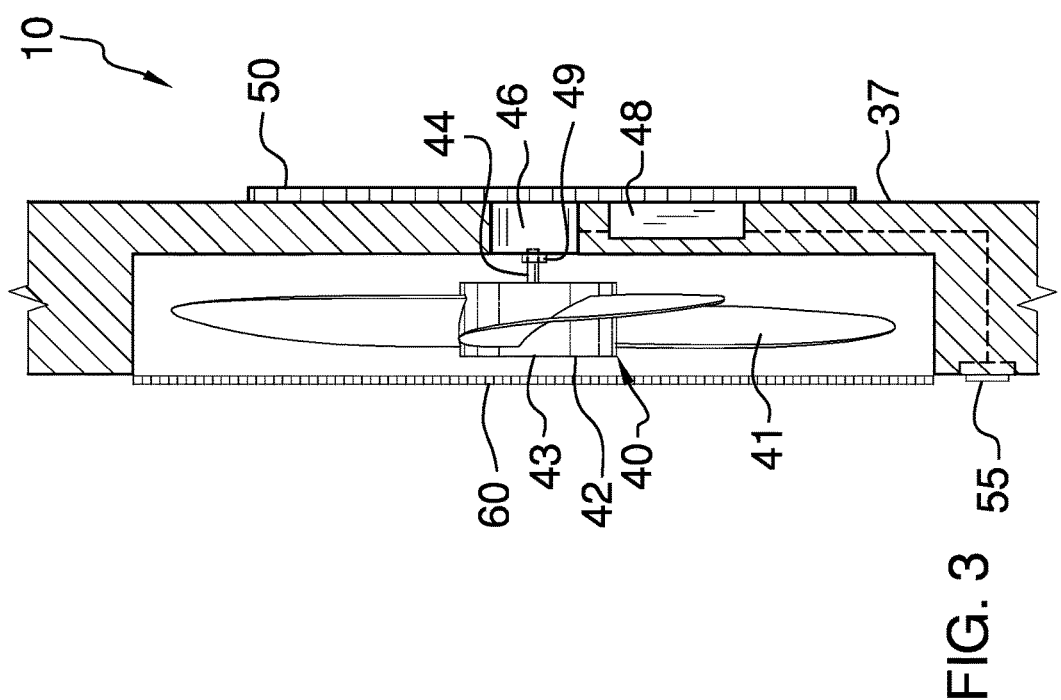
FIG. 3 is a cross-sectional view taken along line 3-3 of FIG. 2.
Figure 4:
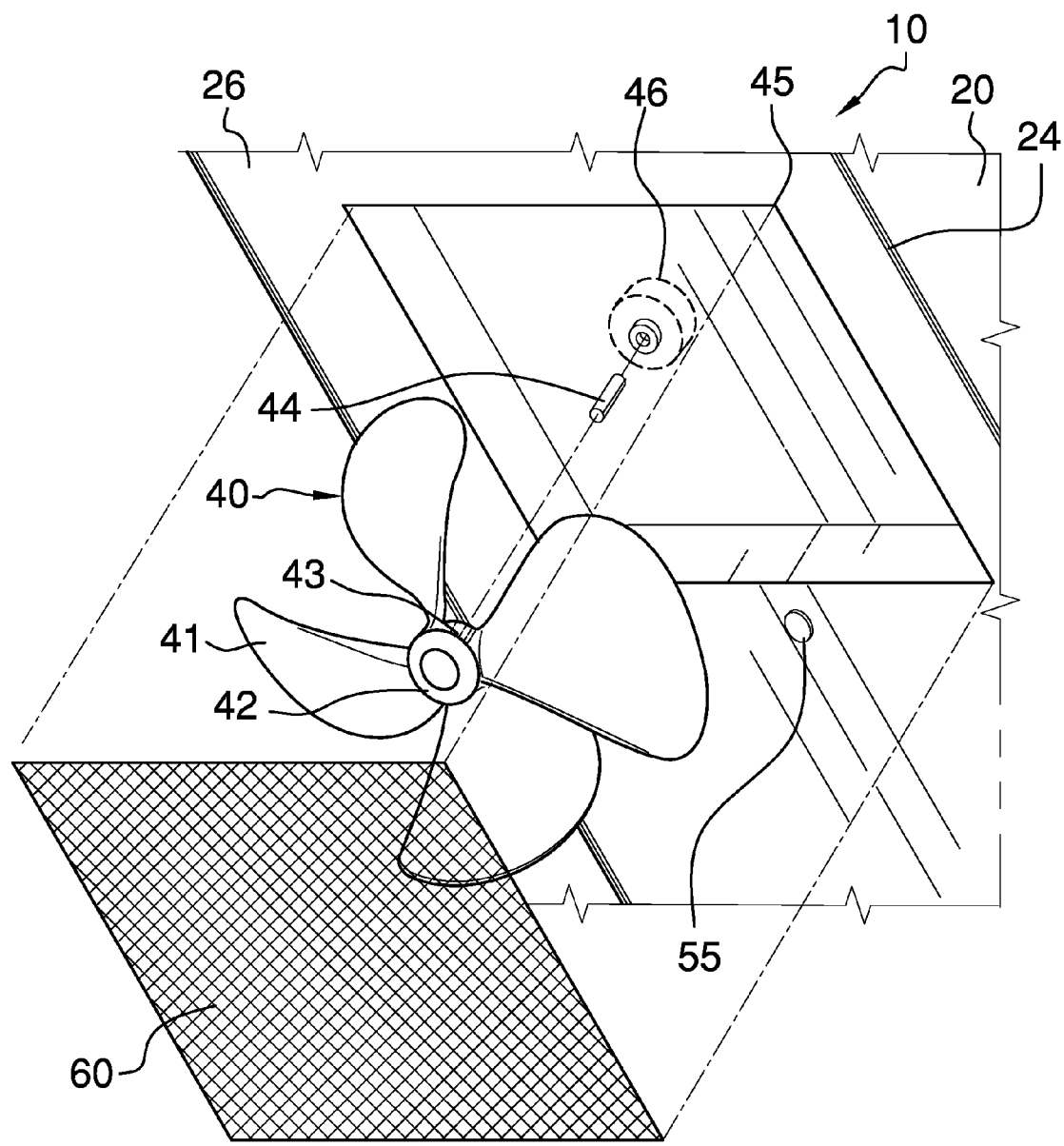
FIG. 4 is a detailed exploded isometric view showing installation of the solar powered fan motor-blade unit onto a panel section.
Figure 5:
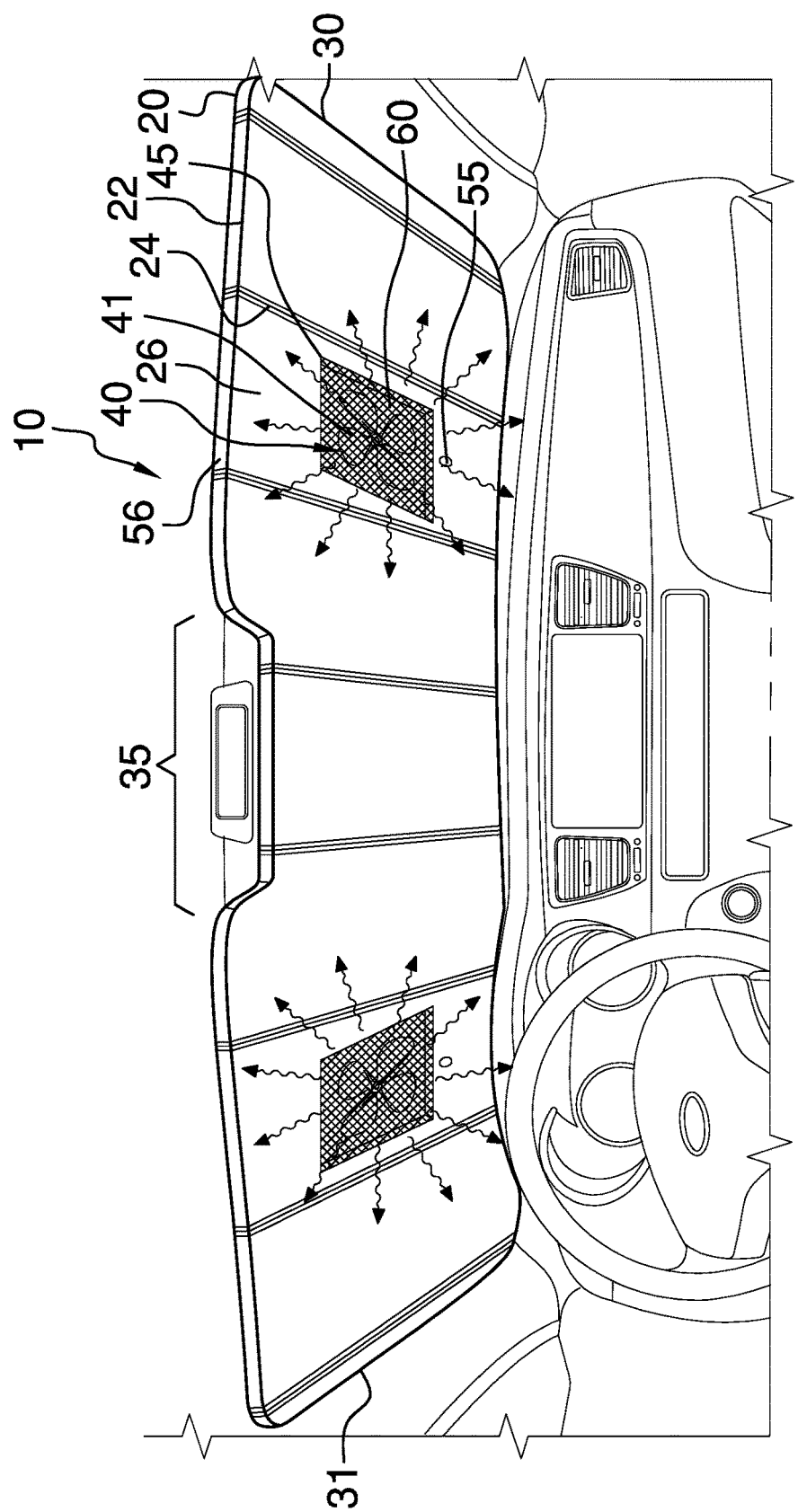
FIG. 5 is an in-use isometric view showing dispersion of air flow from the solar powered fan motor-blade unit within a vehicle.

With reference now to the drawings, and in particular FIGS. 1 through 5 thereof, an example of the instant windshield sunshade with solar powered fans employing the principles and concepts of the present windshield sunshade with solar powered fans and generally designated by the reference number 10 will be described.

Referring to FIGS. 1 through 5 the present windshield sunshade with solar powered fans 10 devised to cool an interior of a vehicle is illustrated. The windshield sunshade with solar powered fans 10 is employed within the vehicle which includes side wall sections extending along lateral edges of the windshield and a rear view mirror attached to a mounting post connecting the rear view mirror to the windshield. The present device 10 includes a foldable opaque panel 20 comprised of a flexible membrane 22 having a plurality of spaced apart pleats 24 along a longitudinal axis and a plurality of panel sections 26. The pleats 26 extend transversely to the longitudinal axis. The pleats 24 permit the panel 20 to be folded for storage. Each of the plurality of panel sections 26 is disposed between a pair of spaced apart pleats 26. The panel 20 includes a pair of opposed, lateral marginal edge portions 30, 31 at the opposite ends of the panel 20 and a notched upper central portion 35 centrally disposed between the marginal edge portions 30, 31 when the panel 20 is in an extended orientation. Also, when in the extended position, the notched upper central portion 35 has a right side 57 and a left side 58. Each panel section 26 also has an outer side 37.

A solar powered fan motor-blade unit 40 is centrally disposed in a recessed portion 45 of each of at least two of the panel sections 26. One of the panel sections with a recessed portion 45 is located on the right side 57 of the notched upper central portion 35 and the other panel section with a recessed portion 45 is located on the left side 58 of the notched upper central portion 35. This places one recessed portion 45 in a position proximal a driver's side of the vehicle and the other recessed portion 45 proximal a front passenger's side of the vehicle when in use. Each fan-motor blade unit 40 has a plurality of vanes 41 attached to a casing 42, a yoke 43 within the casing 42, a motor 49 disposed within the respective panel section 26, and a shaft 44 in operational communication with the yoke 43 and the motor 49. The shaft 44 is detachable from at least one of the yoke 43 and the motor 49 to permit the casing 42 along with the vanes 41 to be detached from the panel section 26 in order to fold the panel 20 for storage. Each fan motor-blade unit 40 includes at least one solar module 46 fixedly disposed on the outer side 37 of the respective panel section 26. The outer side 37 is configured to face toward the windshield during use. The at least one solar module 46 includes at least one storage cell 50 centrally disposed in the respective panel section 26. The at least one storage cell 50 is in operational communication with the at least one solar module 46. The operational communication of the at least one storage cell 50 with the at least one solar module 46 is configured to charge and recharge the at least one storage cell 50. A solar power converter 48 is in operational communication with the motor 49 of each of the respective fan motor-blade units 40 and the respective one of the at least one storage cell 50.

An on-off switch 55 is disposed proximal each fan motor-blade unit 40 in a position proximal a dashboard of the vehicle for easier and safer access than would be provided if the on-off switch 55 were disposed proximal a top end 56 of the panel section 26 in which a user would be required to reach across the fan motor-blade unit 40 to operate the fan motor-blade unit 40. The on-off switch 55 is in operational communication with each fan motor-blade unit 40. The on-off switch 55 has an activated condition and an alternate deactivated condition. In the activated and in the alternate deactivated condition, the on-off switch 55 respectively activates and alternately deactivates the fan motor-blade unit 40.

A protective front grill 60 is disposed solely over the entire one of each recessed portion 45 to protect against contact with the vanes 42 of the fan motor-blade unit 40.

When parking the vehicle in hot weather, the panel 20 is positioned between the windshield and the dashboard with the at least one solar module 46 of the respective panel section 26 positioned to face the windshield. The on-off switch 55 in operational communication with the motor 46 of the respective fan motor-blade unit 40 is activated to activate the respective fan motor-blade unit 40 to assist in cooling the vehicle interior. The opaque quality of the panel 20 reduces the amount of sunlight entering the vehicle interior thereby assisting in reducing heat which would otherwise increase in the vehicle interior.

What is claimed is:

1. A windshield sunshade with solar powered fans for a vehicle, wherein the vehicle includes side wall sections extending along lateral edges of the windshield and wherein the vehicle includes a rear view mirror and a mounting post connecting the rear view mirror to the windshield, the windshield sunshade comprising:

a foldable opaque panel comprised of a flexible membrane having a plurality of spaced apart pleats along a longitudinal axis and a plurality of panel sections, the pleats extending transversely to the longitudinal axis, each of the plurality of panel sections disposed between respective adjacent spaced apart pleats;

wherein the panel has an opposed, lateral marginal edge portion at opposite ends and a notched upper central portion centrally disposed between the marginal edge portions when the panel is in an extended orientation, the notched upper central portion has a right side and a left side, each panel section further has an outer side;

a respective solar powered fan motor-blade unit centrally disposed within a recessed portion in each of at least two of the panel sections, one of the panel sections with a recessed portion located on the right side of the notched upper central portion and another panel section of the panel sections with a recessed portion located on the left side of the notched upper central portion when the panel is in an extended orientation, each fan motor-blade unit having a plurality of vanes attached to a casing, a yoke within the casing, a motor disposed within the respective panel section, and a shaft in operational communication with the yoke and the motor, wherein the shaft is detachable from at least one of the yoke and the motor, each fan motor-blade unit comprising:

at least one solar module fixedly disposed on the outer side of the respective panel section, wherein the outer side is configured to face toward the windshield during use;

at least one storage cell centrally disposed in the recessed portion of the respective panel section, the at least one storage cell being in operational communication with the at least one solar module, wherein the operational communication of the at least one storage cell with the at least one solar module is configured to charge and recharge the at least one storage cell;

a solar power converter in communication with the motor of the respective fan motor-blade unit and the respective at least one storage cell; and an on-off switch proximal the respective fan motor-blade unit, wherein the on-off switch is in operational communication with the motor of the respective fan motor-blade unit;

wherein the on-off switch has an activated condition and an alternate deactivated condition; and wherein in the activated and in the alternate deactivated condition, the on-off switch respectively activates and alternately deactivates the fan motor-blade unit.

2. The windshield sunshade with solar powered fans for the vehicle of claim 1 further comprising a first protective front grill disposed over the entire recessed portion located on the right side of the notched upper central portion and a second protective front grill disposed over the entire recessed portion located on the left side of the notched upper central portion.

* * * * *